Figure 1:
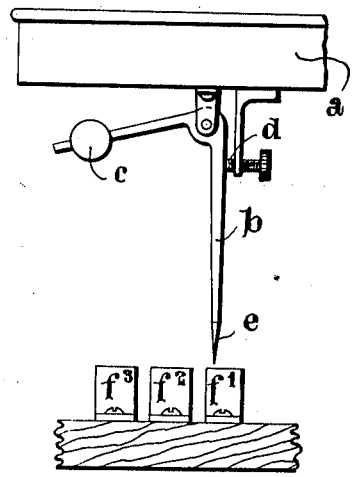

W. H. GRIMSDALE.
APPARATUS FOR PRODUCING MUSIC SHEETS FOR MECHANICAL PIANO PLAYERS, &c.
APPLICATION FILED JAN. 30, 1909.

970,492.

Patented Sept. 20, 1910.

5 SHEETS—SHEET 1.

Attest:
Ewd L. Folsom
Edward N. Sarton

Inventor:
William H. Grimsdale,
By Spear Middleton Donaldson Spear
Attys

W. H. GRIMSDALE.
APPARATUS FOR PRODUCING MUSIC SHEETS FOR MECHANICAL PIANO PLAYERS, &c.
APPLICATION FILED JAN. 30, 1909.
970,492.
Patented Sept. 20, 1910.
5 SHEETS—SHEET 2.
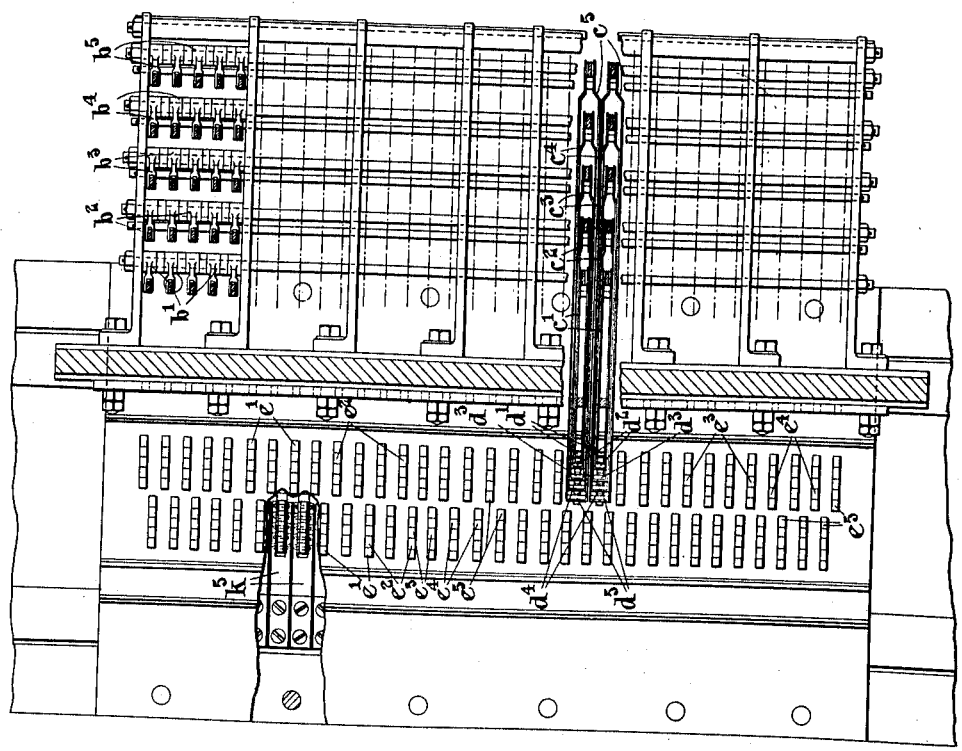
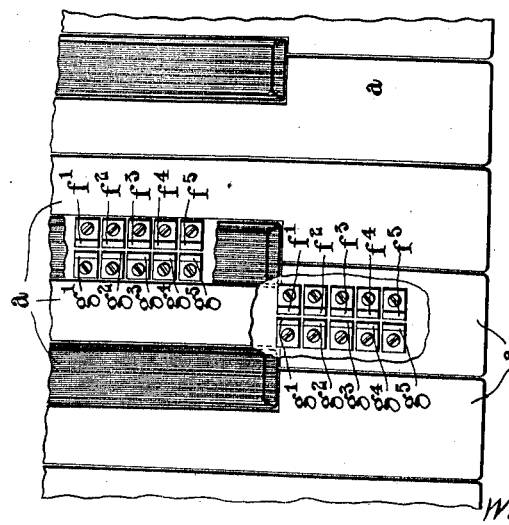
Attest:
Bent M. Stahl.
Ewd L. Tolson.
Inventor.
William H. Grimsdale.

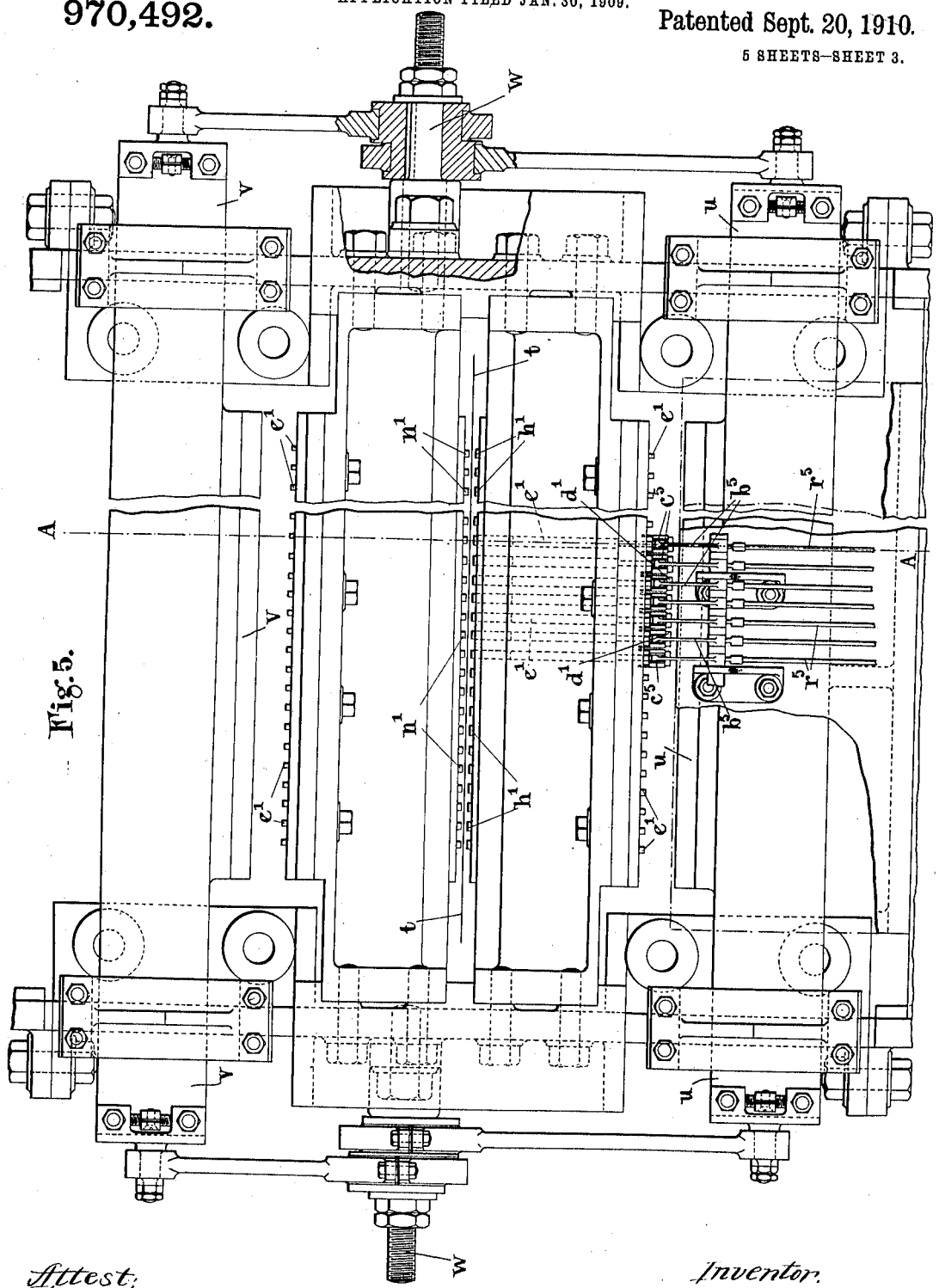

W. H. GRIMSDALE.
APPARATUS FOR PRODUCING MUSIC SHEETS FOR MECHANICAL PIANO PLAYERS, &c.
APPLICATION FILED JAN. 30, 1909.

970,492.

Patented Sept. 20, 1910.
5 SHEETS—SHEET 4.

W. H. GRIMSDALE.
APPARATUS FOR PRODUCING MUSIC SHEETS FOR MECHANICAL PIANO PLAYERS, &c.
APPLICATION FILED JAN. 30, 1909.

970,492.

Patented Sept. 20, 1910.

5 SHEETS—SHEET 5.

UNITED STATES PATENT OFFICE.

WILLIAM HENRY GRIMSDALE, OF TWICKENHAM, ENGLAND.

APPARATUS FOR PRODUCING MUSIC-SHEETS FOR MECHANICAL PIANO-PLAYERS, &c.

970,492.  Specification of Letters Patent.  Patented Sept. 20, 1910.

Application filed January 30, 1909. Serial No. 475,201.

*To all whom it may concern:*

Be it known that I, WILLIAM HENRY GRIMSDALE, a subject of the King of Great Britain and Ireland, and residing at Brantwood, Strafford Road, Twickenham, in the county of Middlesex, England, have invented certain new and useful Improvements in Apparatus for Producing Music-Sheets for Mechanical Piano-Players and Like Instruments, of which the following is a specification.

My invention relates to apparatus for producing music sheets for mechanical piano players and like instruments.

It has been proposed to prepare music sheets which when passed through the player produce a reproduction corresponding in time with the notes as actually played by the performer so that the effect produced by the mechanical player is more nearly that produced by a performer than was the case with music sheets as previously known.

The object of the present invention is to produce a music sheet which when passed through a suitable mechanical piano player or like instrument will give a similar effect as regards expression; so that the strength of the reproduction of any note or notes corresponds with the strength with which such note or notes are struck by the performer in producing the music sheet.

The method and apparatus for producing music sheets according to the present invention are specially applicable to the production of music sheets for piano players in which the strength of blow with which keys of the piano are struck is controlled by a damping device operated by air admitted through apertures in the music sheet and tracker board.

The present invention consists broadly in the manufacture of music sheets for mechanical piano players and like instruments having perforations such that the areas of the air passages through the music sheet into the apertures in the tracker board correspond with the strength with which the keys are struck to form such perforations.

The invention also consists of arrangements for causing the movements of the keys of the piano or any suitable actual or dummy keyboard in playing to actuate the devices whereby the music sheet is prepared so that the record on the music sheet represents the actual notes struck the correct interval between the successive notes and to any desired degree of accuracy the strength with which they are struck.

The invention further consists in devices for perforating music sheets arranged to operate a system of punches in such a manner that the particular punch or punches actuated will depend on the strength of the blow with which the operating key is struck.

The invention also consists in the improved devices for perforating music sheets hereinafter described.

Figure 2:
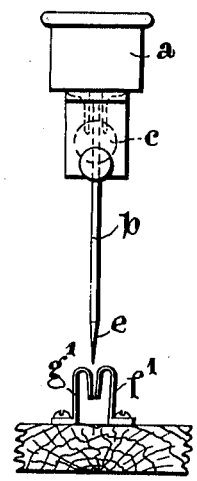
Figure 3:
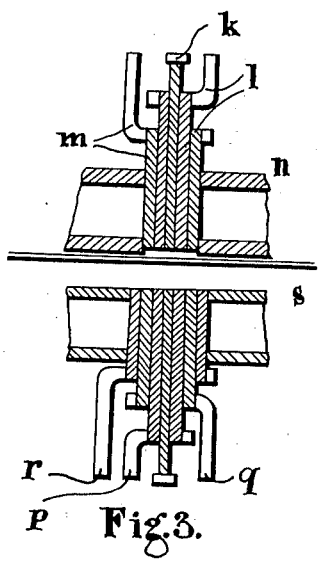
Figure 6:
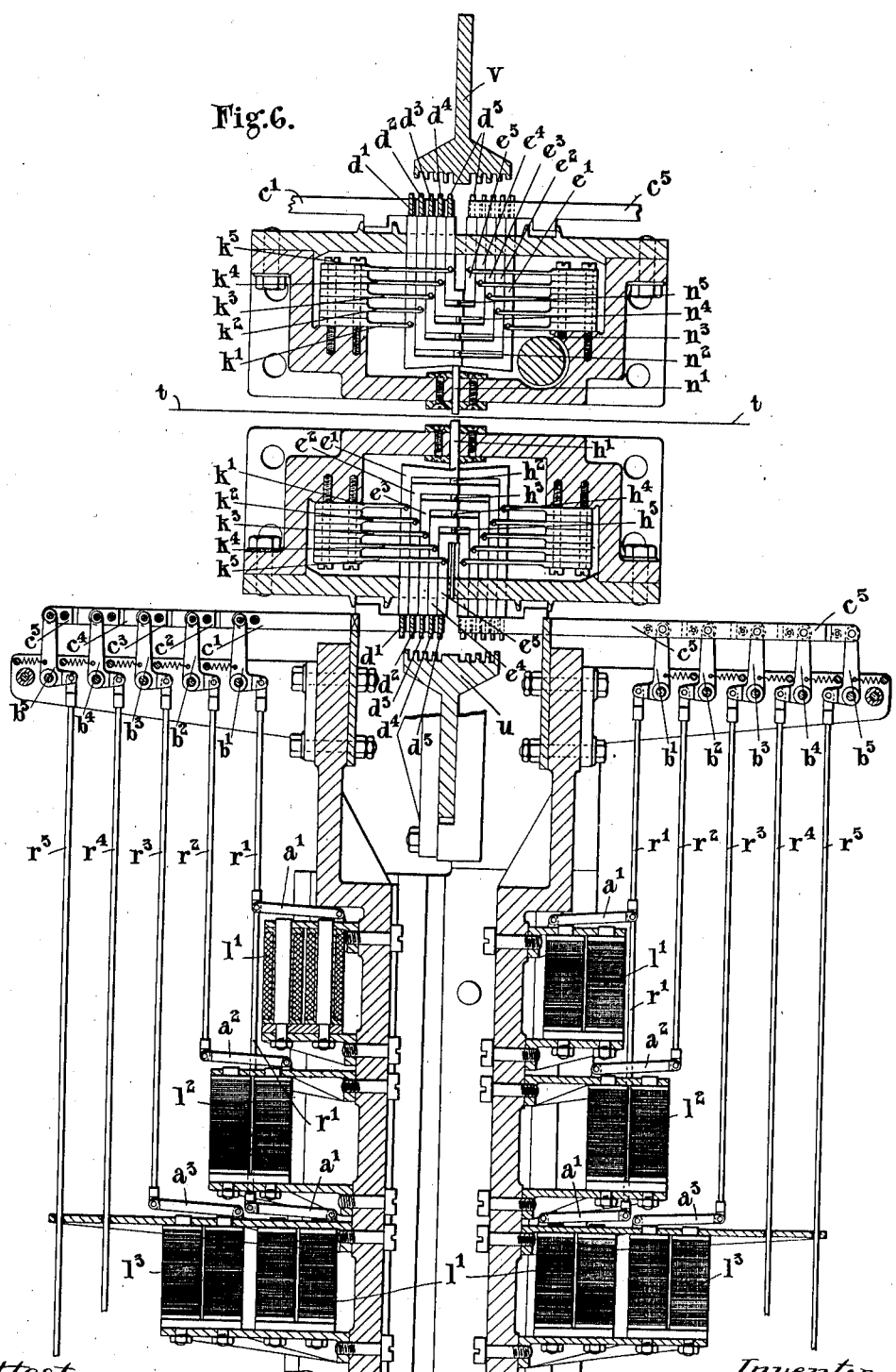
Figure 7:
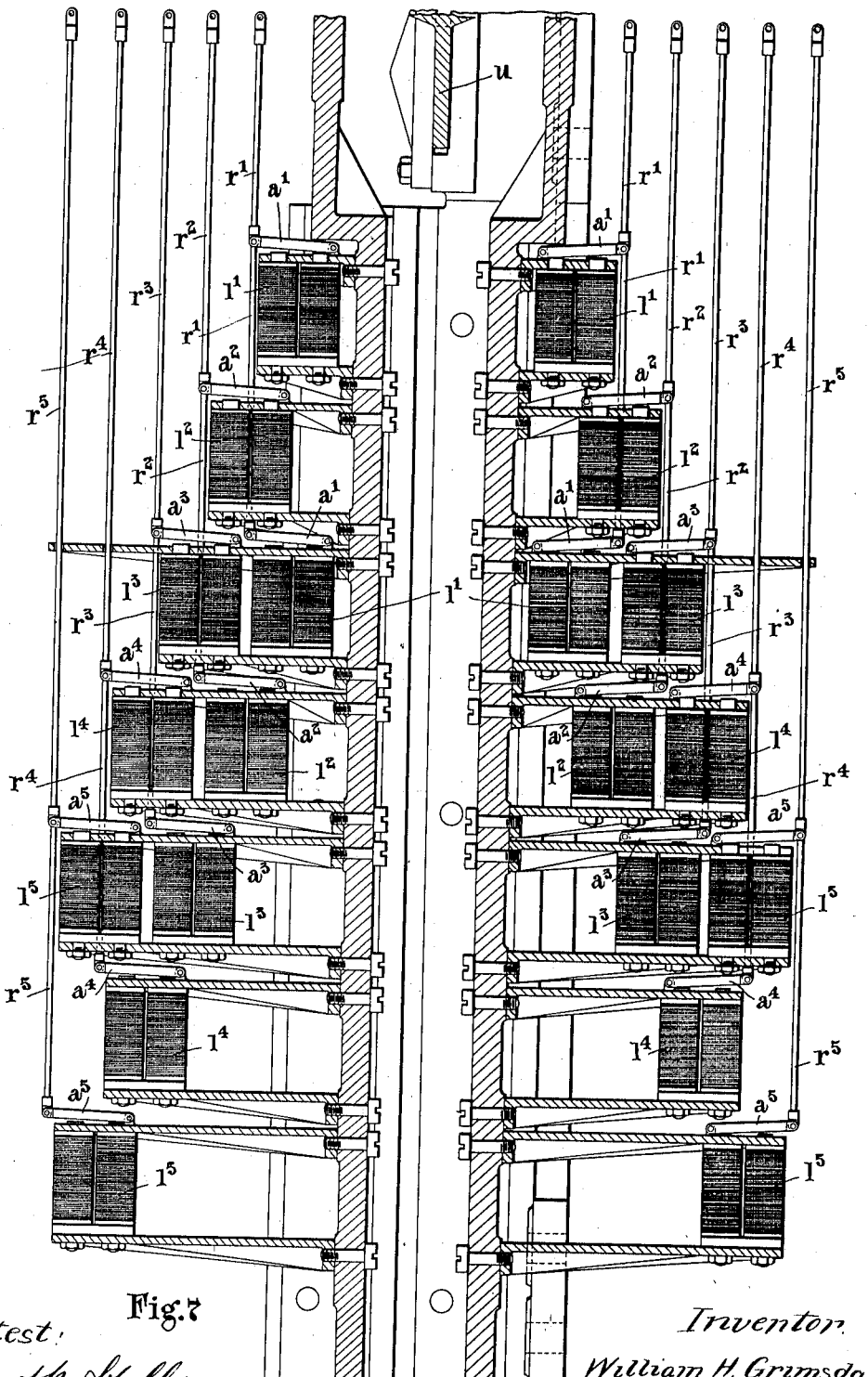

Referring to the accompanying diagrammatic drawings Figure 1 shows in side elevation one of the keys of a piano with the contacts operated by that key. Fig. 2 is an end view of the same. Fig. 3 is a sectional view showing the punches and dies by which the music sheet may be perforated. Fig. 4 is a plan of one arrangement of contacts beneath the keyboard. Fig. 5 is an end elevation of one form of machine for perforating the music sheet. Fig. 6 is a section on the line A—A Fig. 5. Fig. 8 is a plan showing the means employed for selecting the punches. Fig. 7 is a vertical sectional elevation showing the arrangement of the electromagnets operating the punches.

In the form of the invention illustrated the movements of the keys are transmitted electrically to the devices for punching the music sheet. Each key, $a$, is provided with a pivoted contact lever, $b$. One end of this contact lever is vertical or nearly vertical, while the other end carries a weight, $c$. A suitable stop, $d$, is provided to prevent the weight moving the vertical arm in the rearward direction beyond a certain position. The lever end of the contact arm is provided with a contact piece, $e$, adapted to connect the spring contacts, $f'$, $f^2$, $f^3$ and $g'$, $g^2$, $g^3$, respectively according to the inclination of the arm with the vertical. The contacts $g'$, $g^2$ and $g^3$ are behind the contacts $f'$, $f^2$ and $f^3$ in Fig. 1. The pairs of spring contacts $f'$, $g'$, $f^2$, $g^2$ and $f^3$, $g^3$, correspond respectively with the graduations of intensity of sound which it is desired to record and reproduce, and for most cases it will be found that three pairs of contacts as illustrated are sufficient; these are referred to hereafter as the pianissimo, mezzo-forte and fortissimo contacts respectively.

In Figs. 1 and 2 three pairs of contacts are illustrated, while in Fig. 4 five pairs are shown for each key of the keyboard, the latter being suitable for use with a punching machine as illustrated in Figs 5 to 8. In Figs. 1 and 2 the three pairs of contacts corresponding with each key are placed immediately below the key in such a position that the vertical contact arm will connect one or other pair according as the bell crank is rocked more or less about its pivot by the depression of a key, the extent of rocking depending on the speed with which the key is depressed. If five pairs of contacts are used as shown in Fig. 4 the operation is exactly similar.

If the key is depressed with the strength requisite to produce a fortissimo note the movement of the keys, causing the lever to leave its position of rest against the stop, $d$, and as the amount of lag varies with the impact by which the key is depressed the movement of the lever in relation to its stop also varies with the impact of depression and therefore the contact piece at the lever end of the vertical arm descends in positions varying with the strength with which the key is struck. The first pair of contacts, $f'$ $g'$, representing the pianissimo or soft notes are so placed that they are metallically connected by the contact piece when the strength applied in depressing the key is small. The second pair, $f^2$ $g^2$, representing mezzo-forte notes or notes of medium intensity are metallically connected when medium strength is used, and the third pair of contacts, $f^3$ $g^3$, representing the fortissimo or loud notes are so placed that they will be metallically connected when a blow of greater strength is struck on the key. The electrical contacts are placed in suitable circuits adapted to operate the punching devices. A number of these punching devices are provided, one set being provided for each key on the keyboard. One set is illustrated in Fig. 3. The punching devices are mounted on a frame at suitable centers in one or several rows the row or rows being placed transversely to the music sheet. Each punching device comprises three punches $k$ $l$ $m$, of different sizes arranged concentrically or in other suitable positions, and they may be of circular or tubular and fits over the intermediate punch. $k$, may be solid or tubular, the intermediate punch, $l$, is tubular and fits over the inner punch, while the outer punch, $m$, is also tubular and fits over the intermediate punch. The outer punch is mounted in a suitable guide, $n$, and when not in operation the perforating ends of the punches are within the face of the guide. The actuating ends of the punches project one from the other and these ends may be provided with lugs and be operated by means of a reciprocating bar in the punching direction and withdrawn by springs operating on levers attached to the punches. Opposite to the punches are placed concentric dies, $p$ $q$ $r$, arranged in a similar manner to the punches the outer die moving in a suitable guide, $s$. In operation a punch and corresponding die are made to reciprocate at equal speeds but in opposite phases, the punch entering the die at its outward limit.

The electrical devices by which the punches and dies are operated from the sets of contacts above described may be of the form shown in Figs. 4 to 8, and the apparatus is preferably arranged to produce perforations corresponding correctly in time to the time of striking the keys in producing the record.

In the form of the invention illustrated in Figs 4, 5, 6, 7 and 8 each of the pairs of contacts, $f'$, $g'$, $f^2$, $g^2$, etc., is placed in a circuit with a pair of electromagnets, one set only of which, $l'$, $l^2$, $l^3$, $l^4$, $l^5$, is shown in the drawing the other being symmetrically placed on the other side of the music sheet as will be hereinafter described, the circuit containing a source of current so that the electromagnets are energized when contact is made between the contacts $f'$, $g'$, by the arm $e$. Each of the electromagnets is provided with an armature, $a'$, $a^2$, $a^3$, $a^4$, $a^5$, connected to one of a set of rods, $r'$, $r^2$, $r^3$, $r^4$, $r^5$, the lower ends of these rods being connected to bell crank levers, $b'$, $b^2$, $b^3$, $b^4$, $b^5$, whose vertical arms are connected to sliding rods, $c'$, $c^2$, $c^3$, $c^4$, $c^5$, carrying at their ends distance pieces, $d'$, $d^2$, $d^3$, $d^4$, $d^5$, each of which rests on one of a set of arms, $e'$, $e^2$ $e^3$, $e^4$, $e^5$, connected to the dies, $h'$, $h^2$, $h^3$, $h^4$, $h^5$. The arms, $e'$, $e^2$, $e^3$, $e^4$, $e^5$, are normally pressed upward by springs $k'$, $k^2$, $k^3$, $k^4$, $k^5$, fixed to the frame of the machine. The punches, $n'$, $n^2$, $n^3$, $n^4$, $n^5$, are mounted in an exactly similar manner to the dies and are similarly selected by rods and levers by means of sets of electromagnets not shown arranged similarly to the electromagnets $l'$, $l^2$, $l^3$, $l^4$, $l^5$. The operation of the punches and dies is effected by reciprocating bars, $u$, $v$, driven by connecting rods from eccentrics on a shaft, $w$, which rotates continuously at a high speed. The music sheet, $t$, passes continuously through the machine transversely to the line of punches and dies.

The operation of the above described apparatus is as follows:—On the depression of any key one or other of the pair of contacts, $f'$, $g'$, $f^2$, $g^2$, etc., will be connected by the piece, $e$, and a circuit will be made through one or other pair of electromagnets, operating a die and punch. The pair of rods and bell crank levers will then be actuated by the armatures of the pairs of electromagnets causing one of the rods, $c'$, $c^2$, $c^3$, $c^4$, $c^5$, to move forward and placing one of the distance pieces, $d'$, $d^2$, $d^3$, $d^4$, $d^5$, under the teeth of the reciprocating bar $u$. This bar on its downward movement will therefore operate the corresponding die. The punch coöperating with this die will be moved in a similar manner by the bar, $v$, the selection having been effected in an exactly similar way to that above described by one of the punch operating electromagnets. The rate of reciprocation of the bars, $u$, $v$, is very rapid and no tearing of the paper results as the music sheet is passed through the machine.

In the above described apparatus the areas of the air passages through the music sheet into the apertures in the tracker board are varied by the use of a number of punches of different sizes to form apertures of varying width but it will be evident that a number of punches of equal size may be used and that the same effect may be produced by a number of narrow slots made by separate punches the number of slots determining the areas of the required air passages. Also it will be seen that the selectors may be caused to operate valves for pneumatic operation of the punching devices, or may operate them mechanically or otherwise. It will be obvious also that to suit the apparatus for producing a sheet for a piano player in which the admission of air through the tracker board to damping devices on the striking pneumatic decreases the intensity of the note, the above described arrangement may be varied so that the stronger blow on the key produces the narrower perforation.

Having thus described my invention what I claim as new and desire to secure by Letters Patent is:—

1. Apparatus for producing music sheets for a mechanical piano player or like instrument having perforations such that the area of the air passages through the music sheet into the apertures in the tracker board corresponds with notes of varying intensities.

2. Apparatus for producing music sheets for a mechanical piano player or like instrument comprising in combination means for forming perforations in the music sheet, the air passages through the music sheet into the apertures in the tracker board being of different cross-section, and means for varying said cross-section according to the strength with which the key is struck to form such perforations.

3. Apparatus for producing music sheets for a mechanical piano player or like instrument comprising in combination selectors adapted to the keys of a piano or like instrument, a plurality of pairs of contacts, a plurality of means for forming perforations in the music sheet, said perforating means being operated by said contacts, and means whereby the particular pair of contacts operated, depends on the strength with which the key is struck.

4. Apparatus for producing music sheets for a mechanical piano player or like instrument comprising in combination selectors whose action depends on the inertia of a weight, adapted to the keys of a piano or like instrument, a plurality of pairs of contacts, a plurality of means for forming perforations in the music sheet, said perforating means being operated by said contacts, and means whereby the particular pair of contacts operated, depends on the strength with which the key is struck.

5. Apparatus for producing music sheets for a mechanical piano player or like instrument, comprising in combination a keyboard having a plurality of keys, bell cranked levers pivoted to each of said keys, a weight on one arm of each of said levers, a contact piece on the other arm of each of said levers, a plurality of fixed contacts in connection with each contact piece and means whereby the making of any of said contacts operates a perforating device as and for the purpose described.

6. Apparatus for producing music sheets for a mechanical piano player or like instrument comprising in combination a keyboard, keys on said key-board, a number of sets of punches and dies one set corresponding with each key and means for operating and selecting one or other punch and corresponding die of a set when the key corresponding to that set is depressed as and for the purpose described.

7. Apparatus for producing music sheets for a mechanical piano player or like instrument comprising in combination a keyboard, keys on said key-board a number of sets of concentric punches and dies one set corresponding with each key and means for operating and selecting one or other punch and corresponding die of a set when the key corresponding to that set is depressed as and for the purpose described.

In testimony whereof, I affix my signature in presence of two witnesses.

WILLIAM HENRY GRIMSDALE

Witnesses:
  W. J. McADAMS,
  P. A. OUTHWAITE.

It is hereby certified that in Letters Patent No. 970,492, granted September 20, 1910, upon the application of William Henry Grimsdale, of Twickenham, England, for an improvement in "Apparatus for Producing Music-Sheets for Mechanical Piano-Players, &c.," an error appears in the printed specification requiring correction as follows: Page 2, line 51, the words "tubular and fits over the intermediate punch" should be stricken out and the words *other convenient section. The inner punch* inserted instead; and that the said Letters Patent should be read with this correction therein that the same may conform to the record of the case in the Patent Office.

Signed and sealed this 3d day of January, A. D., 1911.

[SEAL.]

E. B. MOORE,
*Commissioner of Patents.*